United States Patent Office 3,139,426
Patented June 30, 1964

3,139,426
PROCESS FOR CONVERSION OF 2,19-CYCLO STEROIDS INTO 10α-STEROIDS
Alexander D. Cross, Mexico City, Mexico, assignor to Syntex Corporation, Panama, Panama, a corporation of Panama
No Drawing. Filed Oct. 19, 1962, Ser. No. 231,833
7 Claims. (Cl. 260—239.55)

The present invention relates to a novel process for the production of cyclopentanophenanthrene derivatives.

More particularly the present invention relates to a novel process for the conversion of 2,19-cyclo steroids into the corresponding 10α-steroids, especially when applied to derivatives of the androstane and pregnane series.

The 10α-steroids obtained by the process of the present invention are important compounds with several types of activities. For instance, 10α-androstane derivatives, such as 10α-androstane-3β,17α-diol or 10α-androstane-3,17-dione have anabolic-androgenic properties with a favorable anabolic-androgenic ratio; 10α-pregnane derivatives, such as 10α-allopregnane-3,20-dione or 16α-methyl-10α-allopregnane-3,20-dione, have progestational properties with good oral activity and exhibit anti-estrogenic, anti-androgenic, and anti-gonadotrophic activities.

The new process object of the present invention is illustrated by the following equation:

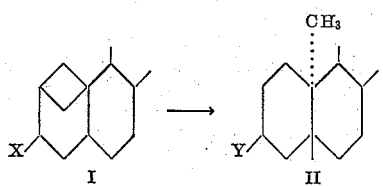

In the above formulae X and Y each represents a hydroxyl or a keto group; when X is hydroxyl, Y is also hydroxyl.

The starting compounds (I) of the process just outlined are obtained in accordance with my copending patent applications Serial Nos. 231,827, 231,828 and 231,829, filed of even date, by treatment of the corresponding 3-keto-19-hydroxy steroids with tosyl chloride under conventional conditions, and reaction of the obtained 3-keto-19-tosyloxy derivatives with a base, such as an alkali metal hydroxide, thus being produced the desired 3-keto-2,19-cyclo steroids, which may be used as the starting compounds of the present process, as well as the corresponding 3-alcohols resulting from conventional reduction.

The aforesaid starting compounds are preferably of the androstane or pregnane series, and may have a number of substituents present in the molecule without interfering with the reaction. For example, at C–17 there may be present a ketone group, a 17β-acyloxy or hydroxy group with or without a lower hydrocarbon residue at C–17α, a 17β-acetyl group with or without a 17α-hydroxy or acyloxy group, or a dihydroxy acetone side chain preferably protected by a 17, 20; 20, 21-bismethylenedioxy grouping; at C–16 there may be present a hydroxyl group, a keto group, a methyl group or the like. Groups similar to the above may also be present in other parts of the molecule, as for example in C–4, C–6, C–11, C–12, etc.

In accordance with the present invention a starting compound of the type described hereinbefore, is treated with hydrogen, under approximately 1 to 100 atmospheres of pressure, at a temperature between approximately 60° and 170° C., for a period of time of about 2 to 24 hours, in an organic solvent, preferably polar, such as lower hydrocarbon alcohols, as for example ethanol, or hydrocarbon carboxylic acid lower alkyl esters of up to 8 carbon atoms, as for example ethyl acetate, in the presence of a heavy metal catalyst, such as platinum, ruthenium or palladium, and optionally in the presence of an acid, preferably a mineral acid such as perchloric acid, or of a base, preferably an alkali metal hydroxide, such as sodium hydroxide, thus affording the corresponding 10α-steroid (II).

The starting compounds of the present invention having carbonyl groups, for example in C–3, may be reduced, partially or totally, in the course of the hydrogenation, thus affording the corresponding alcohols, which may be oxidized, optionally, to regenerate the carbonyl groups.

The isolation of the final product of this reaction has no critical importance, and may be carried out by filtration of the catalyst, followed by evaporation of the solvents and, optionally, by conventional crystallization or chromatography of the residue.

Examples of compounds which may be obtained by the present invention are: 10α-androstane-3β,17β-diol, 10α-androstane-3,17-dione, 10α-allopregnane-3,20-dione, 10α-allopregnane-3β,20β-diol, 16α-methyl-10α-allopregnane-3,20-dione, 16α-methyl-10α-allopregnane - 3β,20β - diol, 16β-methyl-10α-allopregnane-3,20-dione, 16β-methyl-10α-allopregnane-3β,20β - diol, 16α,17α - isopropylidenedioxy-10α-allopregnane-3,20 - dione, 16α,17α - isopropylidenedioxy - 10α - allopregnane - 3β,20β - diol, 10α - allopregnan-17α - ol - 3,20 - dione, 10α - allopregnane - 3β,17α, 20β-triol, 17α-methyl-10α - androstan - 17β - ol - 3-one, 17α-methyl-10α-androstane-3β,17β-diol, 16α-methyl-10α-allopregnan-17α-ol-3,20-dione, 16α-methyl-10α-allopregnane-3β,17α,20β-triol, 17,20; 20,21-bismethylenedioxy-10α-allopregnan-3-one and 17,20; 20,21-bismethylenedioxy-10α-allopregnan-3β-ol.

The following specific examples serve to illustrate, but are not intended to limit the scope of the present invention:

Example I

To a solution of 1 g. of 2,19-cyclo-androstane-3,17-dione (obtained in accordance with my U.S. patent application Ser. No. 231,827, filed of even date, in 100 cc. of ethyl acetate containing 0.1 cc. of perchloric acid were added 300 mg. of platinum oxide, and the whole was shaken under hydrogen, under 100 atmospheres of pressure and at 100° C. during 2 hours. The catalyst was filtered off and the filtrate evaporated to dryness. The residue was chromatographed on alumina thus affording 10α-androstane-3β,17β-diol and 10α-androstane-3,17-dione.

Example II 2,19-cyclo-androstane-3,17-dione was treated according to Example I except that ruthenium oxide was used instead of platinum oxide, thus producing the same final products as in said example.

Example III 2,19-cyclo-androstane-3,17-dione was treated following the procedure described in Example I except that platinum oxide was substituted by 10% palladium on charcoal, thus affording the same final products as in said example.

Example IV

The procedure of Example I was repeated under exactly the same conditions, except that it was carried out in the absence of acid, thus affording identical products to those obtained in said example.

Example V 2,19-cyclo-androstane-3,17-dione was treated with hydrogen in the presence of platinum oxide as described in Example I, except that the reaction was carried out under 50 atmospheres of pressure, at 80° C. during 3 hours, thus affording 10α-androstane-3β,17β-diol and 10α-androstane-3,17-dione.

Example VI 2,19-cyclo-androstane-3,17-dione was treated in accordance with Example I, except that the hydrogenation was carried out under 20 atmospheres of pressure at 110° C. during 4 hours, thus furnishing two products identical with those obtained in said example.

Example VII

The procedure described in Example I was repeated, except that the hydrogenation was effected under 10 atmospheres of pressure at 60° C. during 12 hours, thus affording 10α-androstane-3β,17β-diol and 10α-androstane-3,17-dione.

Example VIII 2,19-cyclo-androstane-3,17-dione was treated with hydrogen in the presence of ruthenium oxide under the conditions described in Example I, except that the reaction was carried out under 1 atmosphere of pressure at 170° C. during 24 hours, thus affording 10α-androstane-3β,17β-diol and 10α-androstane-3,17-dione.

Example IX 2,19-cyclo-androstane-3,17-dione was treated in accordance with Example I, except that ethanol was used instead of ethyl acetate, thus affording two products identical with those obtained in said example.

Example X

The compounds listed under I (obtained in accordance with my aforesaid patent applications) were treated following the procedure described in Example I, thus affording the corresponding products listed under II.

| I | II |
|---|---|
| 2,19-cyclo-allopregnane-3,20-dione | 10α-allopregnane-3,20-dione and 10α-allopregnane-3β,20β-diol. |
| 16α-methyl-2,19-cyclo-allopregnane-3,20-dione. | 16α-methyl-10α-allopregnane-3,20-dione and 16α-methyl-10α-allopregnane-3β,20β-diol. |
| 16β-methyl-2,19-cyclo-allopregnane-3,20-dione. | 16β-methyl-10α-allopregnane-3,20-dione and 16β-methyl-10α-allopregnane-3β,20β-diol. |
| 16α,17α-isopropylidenedioxy-2,19-cyclo-allopregnene-3,20-dione. | 16α,17α-isopropylidenedioxy-10α-allopregnane-3,20-dione and 16α,17α-isopropylidenedioxy-10α-allopregnane-3β,20β-diol. |
| 2,19-cyclo-allopregnan-17α-ol-3,20-dione. | 10α-allopregnan-17α-ol-3,20-dione and 10α-allopregnane-3β,17α,20β-triol. |
| 17α-methyl-2,19-cyclo-androstan-17β-ol-3-one. | 17α-methyl-10α-androstan-17β-ol-3-one and 17α-methyl-10α-androstane-3β,17β-diol. |
| 16α-methyl-2,19-cyclo-allopregnan-17α-ol-3,20-dione. | 16α-methyl-10α-allopregnan-17α-ol-3,20-dione, and 16α-methyl-10α-allopregnane-3β,17α,20β-triol. |
| 17,20;20,21-bismethylene-dioxy-2,19-cyclo-allopregnan-3-one. | 17,20;20,21-bismethylenedioxy-10α-allopregnan-3-one, and 17,20;20,21-bismethylenedioxy-10α,allopregnan-3β-ol. |

Example XI

The procedure described in Example I was repeated, except that perchloric acid was substituted by sodium hydroxide, thus affording the same products as in said example.

I claim:

1. A process for the production of 10α-steroids which comprises treating a 2,19-cyclo steroid selected from the group consisting of androstane and pregnane derivatives with hydrogen in the presence of a heavy metal catalyst.

2. The process of claim 1 wherein the reaction is carried out under 1 to 100 atmospheres of pressure, at a temperature between approximately 60° C. and 170° C., for a period of time of about 2 to to 24 hours, in a polar organic solvent selected from the group consisting of lower hydrocarbon alcohols and hydrocarbon carboxylic lower alkyl esters of up to 8 carbon atoms.

3. The process of claim 2 wherein the reaction is carried out in the presence of an acid.

4. The process of claim 1 wherein the heavy metal catalyst is platinum.

5. The process of claim 1 wherein the heavy metal catalyst is ruthenium.

6. The process of claim 1 wherein the heavy metal catalyst is palladium.

7. The process of claim 2 wherein the reaction is carried out in the presence of a base.

No references cited.